United States Patent
Melzer et al.

(10) Patent No.: US 11,428,775 B2
(45) Date of Patent: Aug. 30, 2022

(54) DETECTION OF INTERFERENCE-INDUCED PERTURBATIONS IN FMCW RADAR SYSTEMS

(71) Applicant: Infineon Technologies AG, Neubiberg (DE)

(72) Inventors: Alexander Melzer, Neutillmitsch (AT); Andreas Dollinger, Graz (AT); Rene Kobler, Linz (AT); Georg Krebelder, Ottensheim (AT); Christoph Wagner, Enns (AT); Martin Wiessflecker, Graz (AT)

(73) Assignee: Infineon Technologies AG

( * ) Notice: Subject to any disclaimer, the term of this patent is extended or adjusted under 35 U.S.C. 154(b) by 0 days.

(21) Appl. No.: 17/019,828

(22) Filed: Sep. 14, 2020

(65) Prior Publication Data

US 2021/0080537 A1    Mar. 18, 2021

(30) Foreign Application Priority Data

Sep. 16, 2019  (DE) .......................... 102019124850.7

(51) Int. Cl.
| | | |
|---|---|---|
| *G01S 7/02* | (2006.01) | |
| *G01S 13/58* | (2006.01) | |
| *G01S 7/35* | (2006.01) | |
| *G01S 13/931* | (2020.01) | |

(52) U.S. Cl.
CPC .............. *G01S 7/023* (2013.01); *G01S 7/354* (2013.01); *G01S 13/584* (2013.01); *G01S 13/931* (2013.01)

(58) Field of Classification Search
CPC .......... G01S 7/023; G01S 7/356; G01S 7/354; G01S 13/931; G01S 13/343; G01S 13/584

USPC ................................................... 342/109, 165
See application file for complete search history.

(56) References Cited

U.S. PATENT DOCUMENTS

| | | | | |
|---|---|---|---|---|
| 5,841,394 A | * | 11/1998 | Sterns ..................... | H01Q 3/267 342/174 |
| 6,120,450 A | * | 9/2000 | Li ........................ | G01S 7/52049 600/447 |
| 6,836,240 B1 | * | 12/2004 | Dubbert .................. | G01S 7/282 342/194 |

(Continued)

FOREIGN PATENT DOCUMENTS

DE        102018130556 A1      6/2020

*Primary Examiner* — Erin F Heard
*Assistant Examiner* — Michael W Justice
(74) *Attorney, Agent, or Firm* — Design IP (57) ABSTRACT

A radar system includes a local oscillator for generating a local oscillator signal, transmission channels, and a reception channel. The transmission channels are designed to generate and output RF radar signals based on the local oscillator signal The transmission channels have phase shifters for setting the phase of the RF radar signals. The reception channel is designed to receive an RF signal and to convert it into a baseband signal by using the local oscillator signal supplied thereto. A method includes operating the local oscillator in a CW mode, setting a specific combination of phase shifts for the phase shifters of the transmission channels, altering the phase of the local oscillator signal supplied to the reception channel or of the phase shifts of the phase shifters by a phase offset, and ascertaining that phase offset for which the baseband signal at least approximately assumes a maximum.

15 Claims, 9 Drawing Sheets

(56) References Cited

U.S. PATENT DOCUMENTS

| | | | | |
|---|---|---|---|---|
| 7,639,171 B2* | 12/2009 | Alland | ............... | H01Q 3/24 |
| | | | | 342/25 R |
| 8,633,851 B2* | 1/2014 | Vacanti | ............... | H01Q 3/34 |
| | | | | 342/149 |
| 8,957,743 B2* | 2/2015 | Reuter | ............... | G01S 7/354 |
| | | | | 333/156 |
| 8,988,275 B2* | 3/2015 | Kisliansky | ............... | G01S 7/414 |
| | | | | 342/28 |
| 9,007,259 B1* | 4/2015 | Minassian | ............... | G01S 7/40 |
| | | | | 342/175 |
| 9,116,227 B2* | 8/2015 | Lee | ............... | G01S 13/931 |
| 9,354,298 B2* | 5/2016 | Vacanti | ............... | H01Q 3/34 |
| 10,101,438 B2* | 10/2018 | Subburaj | ............... | G01S 7/292 |
| 10,551,494 B2* | 2/2020 | Hirai | ............... | B60R 21/00 |
| 10,686,487 B2* | 6/2020 | Kirkpatrick | ............... | H01Q 3/36 |
| 10,871,457 B2* | 12/2020 | Vacanti | ............... | G01S 7/411 |
| 11,054,500 B2* | 7/2021 | Sreekiran | ............... | H01Q 1/3233 |
| 2009/0085800 A1* | 4/2009 | Alland | ............... | G01S 13/343 |
| | | | | 342/25 R |
| 2011/0205105 A1* | 8/2011 | Reuter | ............... | G01S 7/354 |
| | | | | 342/200 |
| 2012/0154203 A1* | 6/2012 | Vacanti | ............... | G01S 13/44 |
| | | | | 342/149 |
| 2013/0214961 A1* | 8/2013 | Lee | ............... | G01S 13/931 |
| | | | | 342/368 |
| 2014/0292561 A1* | 10/2014 | Vacanti | ............... | H01Q 3/34 |
| | | | | 342/149 |
| 2015/0130655 A1* | 5/2015 | Aizawa | ............... | G01S 13/931 |
| | | | | 342/147 |
| 2017/0041038 A1* | 2/2017 | Kirkpatrick | ............... | H04B 1/48 |
| 2018/0052230 A1* | 2/2018 | Hirai | ............... | G01S 13/931 |
| 2019/0049555 A1* | 2/2019 | Sreekiran | ............... | G01S 13/343 |
| 2020/0072764 A1* | 3/2020 | Vacanti | ............... | G01N 22/00 |
| 2020/0174098 A1 | 6/2020 | Lang et al. | | |
| 2020/0319300 A1* | 10/2020 | Ioffe | ............... | G01S 13/26 |
| 2021/0286049 A1* | 9/2021 | Sreekiran | ............... | G01S 13/343 |

* cited by examiner

| Combination i | $\phi_{TX1}$ | $\phi_{TX2}$ | $\phi_{TX3}$ | Optimum $\gamma_i$ |
|---|---|---|---|---|
| 0 | 0° | 0° | 0° | $\gamma_0$ |
| 1 | 0° | 90° | 0° | $\gamma_1$ |
| 2 | 0° | 180° | 0° | $\gamma_2$ |
| 3 | 0° | 270° | 0° | $\gamma_3$ |
| 4 | 0° | 0° | 90° | $\gamma_4$ |
| 5 | 0° | 90° | 90° | $\gamma_5$ |
| ⋮ | ⋮ | ⋮ | ⋮ | ⋮ |

DETECTION OF INTERFERENCE-INDUCED PERTURBATIONS IN FMCW RADAR SYSTEMS

FIELD

The present description relates to the field of radar sensors, in particular signal processing methods used in radar sensors and intended to improve the detection of radar targets.

BACKGROUND

Radar sensors are used in a multiplicity of applications for detecting objects, wherein the detection usually comprises measuring distances and velocities of the detected objects. In particular in the automotive sector, there is an increasing need for radar sensors that can be used inter alia in driving assistance systems (advanced driver assistance systems, ADAS) such as e.g. in adaptive cruise control (ACC, or radar cruise control) systems. Such systems can automatically adapt the velocity of an automobile so as to keep a safe distance from other automobiles traveling ahead (and also from other objects and from pedestrians). Further applications in the automotive sector are e. g. blind spot detection, lane change assist and the like. In the field of autonomous driving, radar sensors and systems having multiple sensors will play an important part for the control of autonomous vehicles.

The reliability of the detection of radar targets is dependent among other things on the noise that the received radar signals contain, which is in turn influenced by various factors, among other things by the phases of the transmitted radar signals and in particular the relationship of said phases with respect to one another and the relationship of said phases with respect to the local oscillator signal. The description that follows describes an approach to improve the noise characteristics of radar transceivers.

SUMMARY

The description below relates to a method for a radar system. According to an example, the radar system has a local oscillator for generating a local oscillator signal and also multiple transmission channels and at least one reception channel, which are supplied with the local oscillator signal. The transmission channels are designed to generate and output RF radar signals based on the local oscillator signal, wherein the transmission channels have phase shifters for setting the phase of the RF radar signals. The reception channel is designed to receive an RF signal and to convert it into a baseband signal by using the local oscillator signal supplied to the reception channel. According to the exemplary embodiment, the method includes operating the local oscillator in a continuous wave (CW) mode, setting a specific combination of phase shifts for the phase shifters of the transmission channels, altering the phase of the local oscillator signal supplied to the reception channel or of the phase shifts of the phase shifters by a phase offset, and ascertaining that phase offset for which the baseband signal at least approximately assumes a maximum.

In addition, a radar system is described that, according to an exemplary embodiment, includes the following: a local oscillator for generating a local oscillator signal, multiple transmission channels and at least one reception channel that are supplied with the local oscillator signal, multiple phase shifters and a system controller. The transmission channels are designed to generate and output RF radar signals based on the local oscillator signal, and the reception channel is designed to receive an RF signal and to convert it into a baseband signal by using the local oscillator signal supplied to the reception channel. One each of the phase shifters is arranged in each reception channel in order to set the phase of the respective RF radar signal. The system controller is designed to configure the local oscillator for the CW mode, to set a specific combination of phase shifts for the phase shifters of the transmission channels, to alter the phase of the local oscillator signal supplied to the reception channel by using a further phase shifter or to alter the phase shifts of the phase shifters by a phase offset, and to use a computing unit to ascertain that phase offset for which the baseband signal at least approximately assumes a maximum.

In addition, a radar method is described. According to an exemplary embodiment, the radar method includes setting a first relative phase and a second relative phase in a radar system, wherein the first relative phase determines a first phase difference between a local oscillator signal used by a reception channel of the radar system and a first RF radar signal output by a first transmission channel of the radar system, and wherein the second relative phase determines a second phase difference between the local oscillator signal and a second RF radar signal output by a second transmission channel of the radar system. The setting of the first relative phase and the second relative phase includes the following: selecting a first phase shift and a second phase shift of a first phase configuration of a modulation scheme for the first transmission channel and the second transmission channel, respectively; ascertaining a first phase offset associated with the first phase configuration of the modulation scheme; setting the first relative phase based on the first phase shift of the first phase configuration and the first phase offset and setting the second relative phase based on the second phase shift of the first phase configuration and the first phase offset. The radar method additionally includes receiving an RF signal in the reception channel and mixing the received RF signal with the local oscillator signal in order to generate a baseband signal, and generating a range Doppler map based on the baseband signal, wherein the generating of a range Doppler map includes an operation to compensate for an influence of the first phase offset.

BRIEF DESCRIPTION OF THE DRAWINGS

Exemplary embodiments are explained in more detail below on the basis of figures. The depictions are not necessarily to scale and the exemplary embodiments are not limited just to the depicted aspects. Rather, importance is attached to presenting the principles on which the exemplary embodiments are based. In the figures.

DETAILED DESCRIPTION

Figure 1:
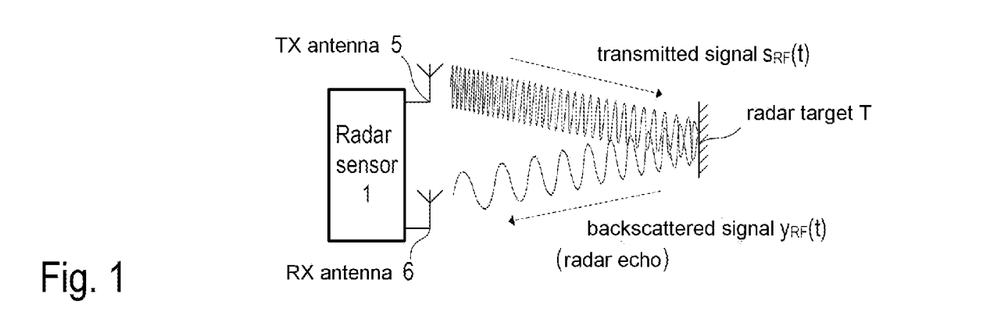
FIG. 1 is an outline to illustrate the operating principle of an FMCW radar system for distance and/or velocity measurement.

FIG. 1 uses a schematic diagram to illustrate the use of a frequency-modulated continuous-wave radar system for the most part referred to as a frequency-modulated continuous-wave (FMCW) radar system as a sensor for measuring distances and velocities of objects, which are usually referred to as radar targets. In the present example, the radar apparatus 1 has separate transmitting (TX) and receiving (RX) antennas 5 and 6, referred to as a bistatic or pseudo-monostatic radar configuration. It should be noted, however, that a single antenna can also be used, which serves as transmitting antenna and as receiving antenna simultaneously (monostatic radar configuration). The transmitting antenna 5 transmits a continuous RF signal $s_{RF}(t)$, which is frequency-modulated with a type of sawtooth signal (periodic, linear frequency ramp), for example. The transmitted signal $s_{RF}(t)$ is scattered back from the radar target T and the backscattered/reflected signal $y_{RF}(t)$ (echo signal) is received by the receiving antenna 6. FIG. 1 shows a simplified example; in practice, radar sensors are systems having multiple transmission (TX) and reception (RX) channels, so as also to be able to determine the angle of incidence (Direction of Arrival, DoA) of the backscattered/reflected signal $y_{RF}(t)$ and hence more accurately locate the radar target T.

Figure 2:
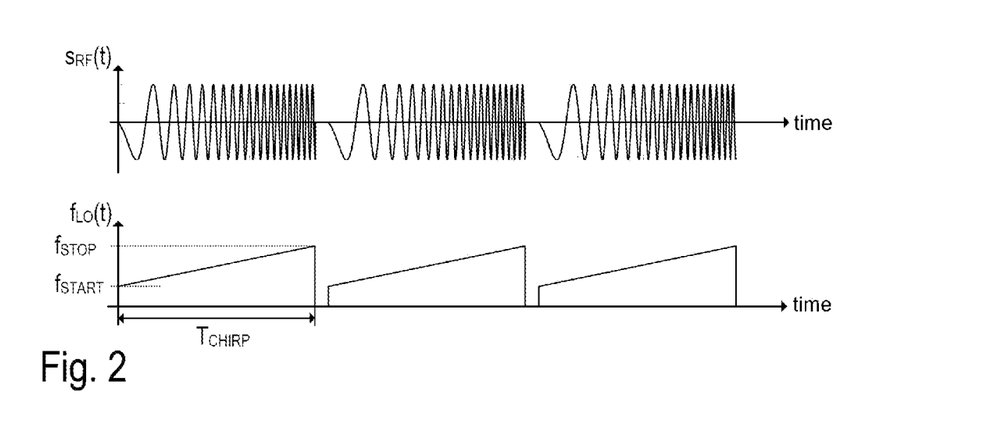
FIG. 2 comprises two timing diagrams to illustrate the frequency modulation (FM) of the RF signal generated by the FMCW system.

FIG. 2 illustrates the aforementioned frequency modulation of the signal $s_{RF}(t)$ in exemplary fashion. As depicted in FIG. 2 (top graph), the transmitted RF signal $s_{RF}(t)$ is made up of a set of "chirps", i.e. the signal $s_{RF}(t)$ comprises a sequence of pulses having sinusoidal waveforms with rising frequency (up-chirp) or falling frequency (down-chirp). In the present example, the instantaneous frequency $f_{LO}(t)$ of a chirp rises linearly, beginning at a start frequency $f_{START}$ to a stop frequency $f_{STOP}$ within a time period $T_{CHIRP}$ (see bottom graph in FIG. 2). Such chirps are also referred to as "linear frequency ramps". FIG. 2 depicts three identical linear frequency ramps. It should be noted, however, that the parameters $f_{START}$, $f_{STOP}$, $T_{CHIRP}$ and the pause between the individual frequency ramps can vary. Other parameters such as e.g. the phase can also be individually set for each chirp. The change of frequency also does not necessarily have to be linear (linear chirp). Depending on the implementation, transmission signals with exponential or hyperbolic frequency variation (exponential or hyperbolic chirps) can also be used, for example. For a measurement, a sequence of frequency ramps is always transmitted and the resulting echo signal is evaluated in baseband or the intermediate-frequency band in order to detect one or more radar targets.

Figure 3:
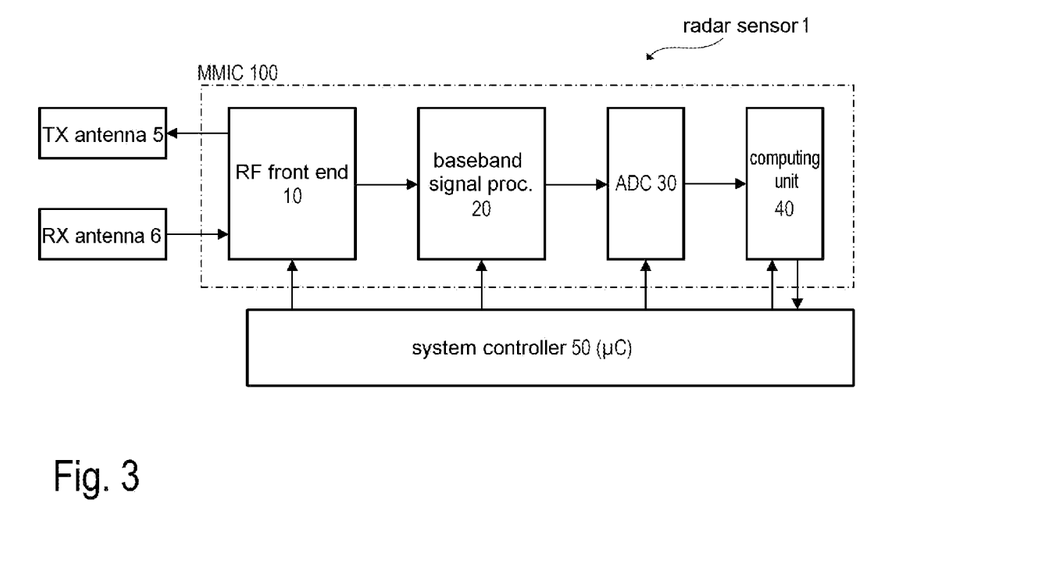
FIG. 3 is a block diagram to illustrate the basic structure of an FMCW radar system.

FIG. 3 is a block diagram depicting a possible structure of a radar apparatus 1 (radar sensor) in exemplary fashion. Accordingly, at least one transmitting antenna 5 (TX antenna) and at least one receiving antenna 6 (RX antenna) are connected to an RF front end 10, integrated in a chip, that can contain all those circuit components that are needed for the RF signal processing. These circuit components comprise for example a local oscillator (LO), RF power amplifiers, low-noise amplifiers (LNA), directional couplers (e.g. rat-race couplers, circulators, etc.) and also mixers for down-conversion of the RF signals to baseband or an intermediate-frequency band (IF band). The RF front end 10 can be integrated if necessary together with further circuit components in a chip, which is usually referred to as a monolithically microwave integrated circuit (MIMIC). Baseband is sometimes also referred to as IF band (depending on the implementation). No further distinction is drawn below between baseband and IF band, and only the term baseband is used. Baseband signals are those signals on the basis of which the detection of radar targets is performed.

The depicted example shows a bistatic (or pseudo-monostatic) radar system having separate RX and TX antennas. In the case of a monostatic radar system, the same antenna would be used both to transmit and to receive the electromagnetic (radar) signals. In this case, for example a directional coupler (e.g. a circulator) can be used to separate the RF signals to be transmitted from the received RF signals (radar echo signals). As mentioned, radar systems in practice usually have multiple transmission and reception channels having multiple transmitting and receiving antennas (antenna arrays), which allows, among other things, measurement of the direction (DoA) from which the radar echoes are received. In such MIMO (Multiple-Input Multiple-Output) systems, the individual TX channels and RX channels are usually each of the same or a similar design and can be distributed over multiple integrated circuits (MMICs).

In the case of an FMCW radar system, the RF signals transmitted via the TX antenna 5 can be e.g. in the range from approximately 20 GHz to 100 GHz (e.g. in the range from approximately 76-81 GHz in a good many applications). As mentioned, the RF signal received by the RX antenna 6 contains the radar echoes (chirp echo signals), i.e. those signal components that are scattered back from one or more radar targets. The received RF signal $y_{RF}(t)$ is down-converted to baseband and processed further in baseband by means of analog signal processing (see FIG. 3, analog baseband signal processing chain 20). Said analog signal processing substantially comprises a filtering and if necessary an amplification of the baseband signal. The baseband signal is finally digitized (see FIG. 3, analog-to-digital converter 30) and processed further in the digital domain.

The digital signal processing chain can be realized at least partly as software, which can be executed on a processor (see FIG. 3, computing unit 40), for example a microcontroller or a digital signal processor. The overall system is normally controlled by means of a system controller 50, which can likewise be implemented at least partly as software that is executed on a processor such as e.g. a microcontroller. The RF front end 10 and the analog baseband signal processing chain 20 and also the analog-to-digital converter 30 and optionally also the computing unit 40 (or parts thereof) can be integrated together in a single MMIC (i.e. on an RF semiconductor chip). Alternatively, the individual components can also be distributed over multiple MMICs. The computing unit 40 or parts thereof can be contained in the system controller 50.

In the examples described here, "computing unit" means any structure or group of functional entities that are designed to perform the necessary functions (calculations). A computing unit can comprise one or more processors designed to execute software/firmware instructions. The computing unit can (additionally or alternatively) also have hardwired hardware units, however, that are designed especially to quickly perform specific calculations (e.g. a CFAR algorithm or a fast Fourier transformation, etc.). The computing unit is not necessarily integrated in one chip but rather can also be distributed over multiple chips.

The system controller 50 can be integrated in a separate chip and designed to communicate with the MMIC 100 (or multiple MMICs) via one or more communication connections. Suitable communication connections are e.g. a serial peripheral interface (SPI) bus or low-voltage differential signalling (LVDS) in accordance with the TIA/EIA-644 standard. Parts of the aforementioned computing unit can be integrated in the system controller 50. The computing unit or parts thereof can also be integrated in the radar MMIC.

Figure 4:
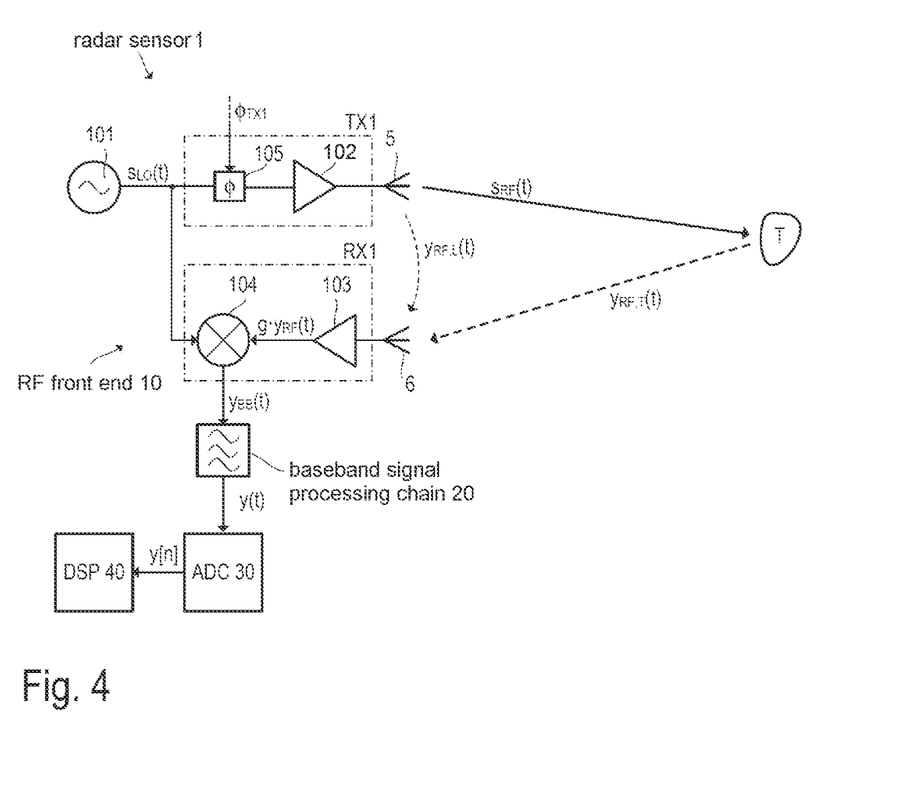
FIG. 4 is a circuit diagram to illustrate a simplified example of a radar transceiver, in particular of the RF front end of a radar transceiver.
Figure 5:
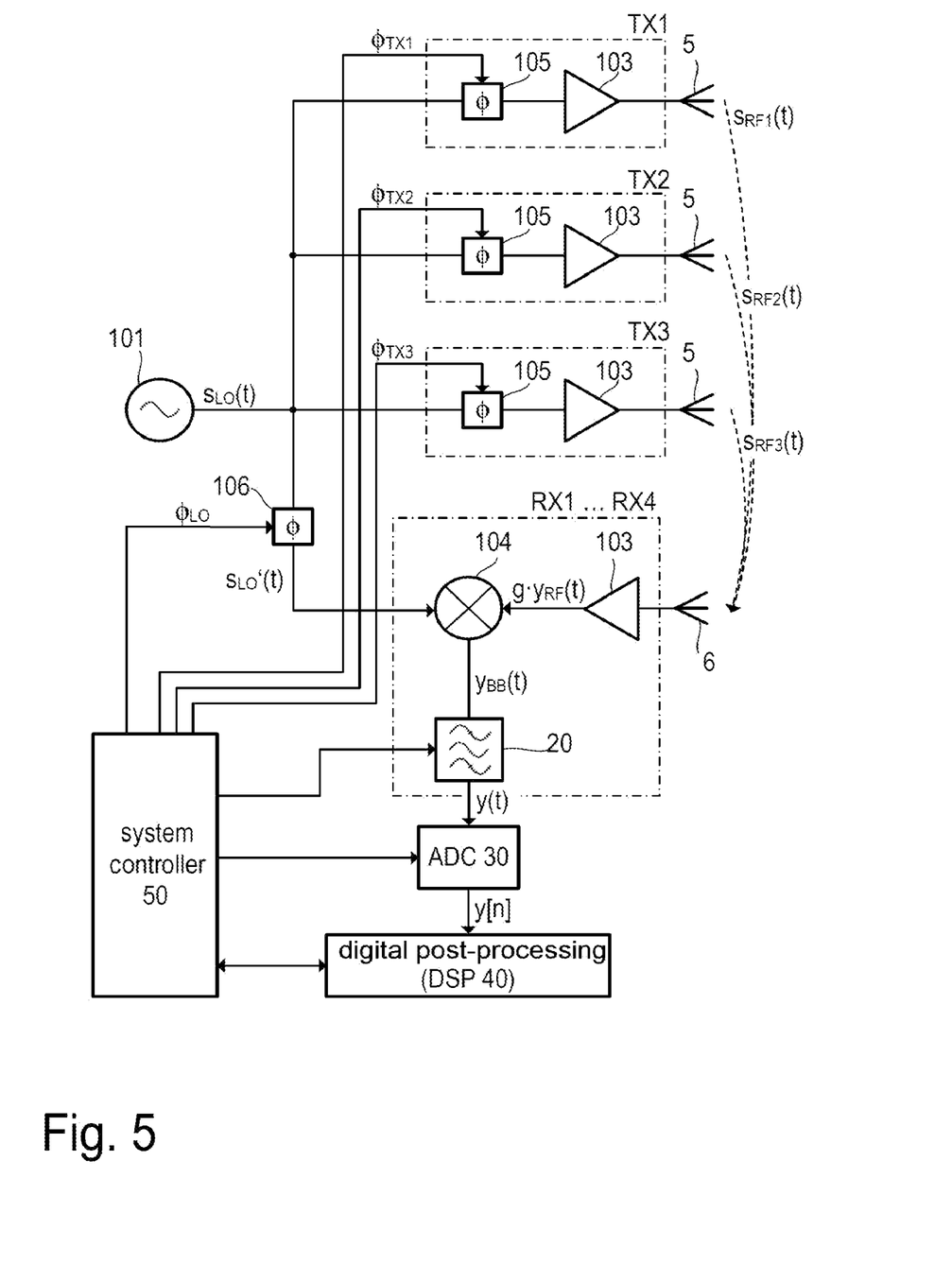
FIG. 5 illustrates an example of a radar transceiver having multiple TX channels and multiple RX channels.

FIG. 4 illustrates an exemplary implementation of a radar transceiver 1 in accordance with the example from FIG. 3 in more detail. In the present example, in particular the RF front end 10 of the radar transceiver 1 is depicted. It should be noted that FIG. 5 depicts a simplified circuit diagram in order to show the basic structure of the RF front end 10 with a transmission channel (TX channel TX1) and a reception channel (RX channel RX1). As mentioned, actual implementations, which can be highly dependent on the specific application, are usually more complex and have multiple TX and/or RX channels, which can also be integrated in different MMICs.

The RF front end 10 comprises a local oscillator 101 (LO) that generates an RF oscillator signal $s_{LO}(t)$. The RF oscillator signal $s_{LO}(t)$ is frequency-modulated during operation—as described above with reference to FIG. 2—and is also referred to as LO signal. In radar applications, the LO signal is usually in the SHF (super high frequency) or EHF (extremely high frequency) band, e.g. in the range from 76 GHz to 81 GHz in a good many automotive applications. A fair number of radar systems operate in the 24 GHz ISM band (industrial, scientific and medical band). The LO signal $s_{LO}(t)$ is processed both in the transmission signal path TX1 (in the TX channel) and in the received signal path RX1 (in the RX channel).

The transmission signal $s_{RF}(t)$ (cf. FIG. 2) transmitted by the TX antenna 5 is generated by amplifying the LO signal $s_{LO}(t)$, for example by means of the RF power amplifier 102, and is therefore merely an amplified and possibly phase-shifted version (see phase shifter 105) of the LO signal $s_{LO}(t)$. The output of the amplifier 102 can be coupled to the TX antenna 5 (in the case of a bistatic/pseudo-monostatic radar configuration). The received signal $y_{RF}(t)$ received by the RX antenna 6 is supplied to the receiver circuit in the RX channel and hence directly or indirectly to the RF port of the mixer 104. In the present example, the RF received signal $y_{RF}(t)$ (antenna signal) is pre-amplified by means of the amplifier 103 (gain g). The mixer 104 thus receives the amplified RF received signal $g \cdot y_{RF}(t)$. The amplifier 103 can be e.g. an LNA (low-noise amplifier). The reference port of the mixer 104 is supplied with the LO signal $s_{LO}(t)$, so that the mixer 104 down-converts the (pre-amplified) RF received signal $y_{RF}(t)$ to baseband. The down-converted baseband signal (mixer output signal) is denoted by $y_{BB}(t)$.

This baseband signal $y_{BB}(t)$ is first processed further in analog fashion, the analog baseband signal processing chain 20 substantially causing an amplification and a (e.g. bandpass or high-pass) filtering, for example in order to reject undesirable sidebands and image frequencies. The resulting analog output signal, which is supplied to an analog-to-digital converter (see FIG. 3, ADC 30), is denoted by y(t). Methods for digital further processing of the digitized output signal (digital radar signal y[n]) are known per se (for example range-Doppler analysis) and are therefore not discussed in more detail here.

In the present example, the mixer 104 down-converts the pre-amplified RF received signal $g \cdot y_{RF}(t)$ (i.e. the amplified antenna signal) to baseband. The conversion can take place in one stage (that is to say from the RF band directly to baseband) or via one or more intermediate stages (that is to say from the RF band to an intermediate-frequency band and on to baseband). In this case, the receiving mixer 104 effectively comprises multiple series-connected individual mixer stages. In addition, the mixer stage can contain an IQ mixer that generates two baseband signals (in-phase and quadrature signals) that can be interpreted as a real part and an imaginary part of a complex baseband signal.

As depicted in FIG. 4, the receiving antenna 6 of the reception channel RX1 receives a superimposition comprising the signal $y_{RF,T}(t)$ reflected from the target T and a direct crosstalk from the transmitting antenna 5, which is also referred to as leakage signal $y_{RF,L}(t)$. Reflections from an object situated right in front of the antennas (sometimes also called "blockers") are also referred to as crosstalk here and contribute in equal measure to the leakage signal. Both signals $y_{RF,T}(t)$ and $y_{RF,L}(t)$ are substantially delayed and attenuated versions of the output signal $s_{RF}(t)$ of the transmission channel TX1. The time delay between the output signal $s_{RF}(t)$ of the transmission channel TX1 and the received leakage signal $y_{RF,L}(t)$ (crosstalk) is relatively short (in comparison with the time delay of the echo signal $y_{RF,T}(t)$ from the target). In the normal radar mode, the leakage signal $y_{RF,L}(t)$ therefore causes a correspondingly low-frequency component in the baseband signal $y_{BB}(t)$, and this low-frequency component of the baseband signal $y_{BB}(t)$ is rejected in the baseband signal processing chain 20. For this purpose, the baseband signal processing chain 20 can have a bandpass filter or a high-pass filter having a suitable cut-off frequency.

FIG. 5 illustrates an example of a radar transceiver having a multiplicity of TX channels and RX channels, three TX channels TX1, TX2 and TX3 and one RX channel RX1 being depicted by way of example. The RX channel RX1 represents a multiplicity of RX channels RX1, RX2, RX3, etc., by way of example, which may all be of the same type of design. The TX channels TX1, TX2 and TX3 are of substantially the same design as in the example from FIG. 4 and reference is made to the above description to avoid repetition. The same applies for the RX channel RX1. The settings of the phases $\phi_{TX1}$, $\phi_{TX2}$ and $\phi_{TX3}$ of the phase shifters 105 in the transmission channels TX1, TX2 and TX3 can be performed by the system controller 50. The system from FIG. 5 can also have a further phase shifter 106, which is designed to shift the phase of the LO signal $s_{LO}(t)$ before the latter is supplied to the RX channel RX1. That is to say that the phase shifter 106 is connected between the local oscillator 101 and the reception channel RX1. The phase-shifted LO signal supplied to the RX channels is denoted by $s_{LO}'(t)$. The phase shifter 106, which is designed to delay the LO signal $s_{LO}(t)$ by a phase offset $\phi_{LO}$, is optional and the use thereof is described in even more detail later on.

Figure 6:
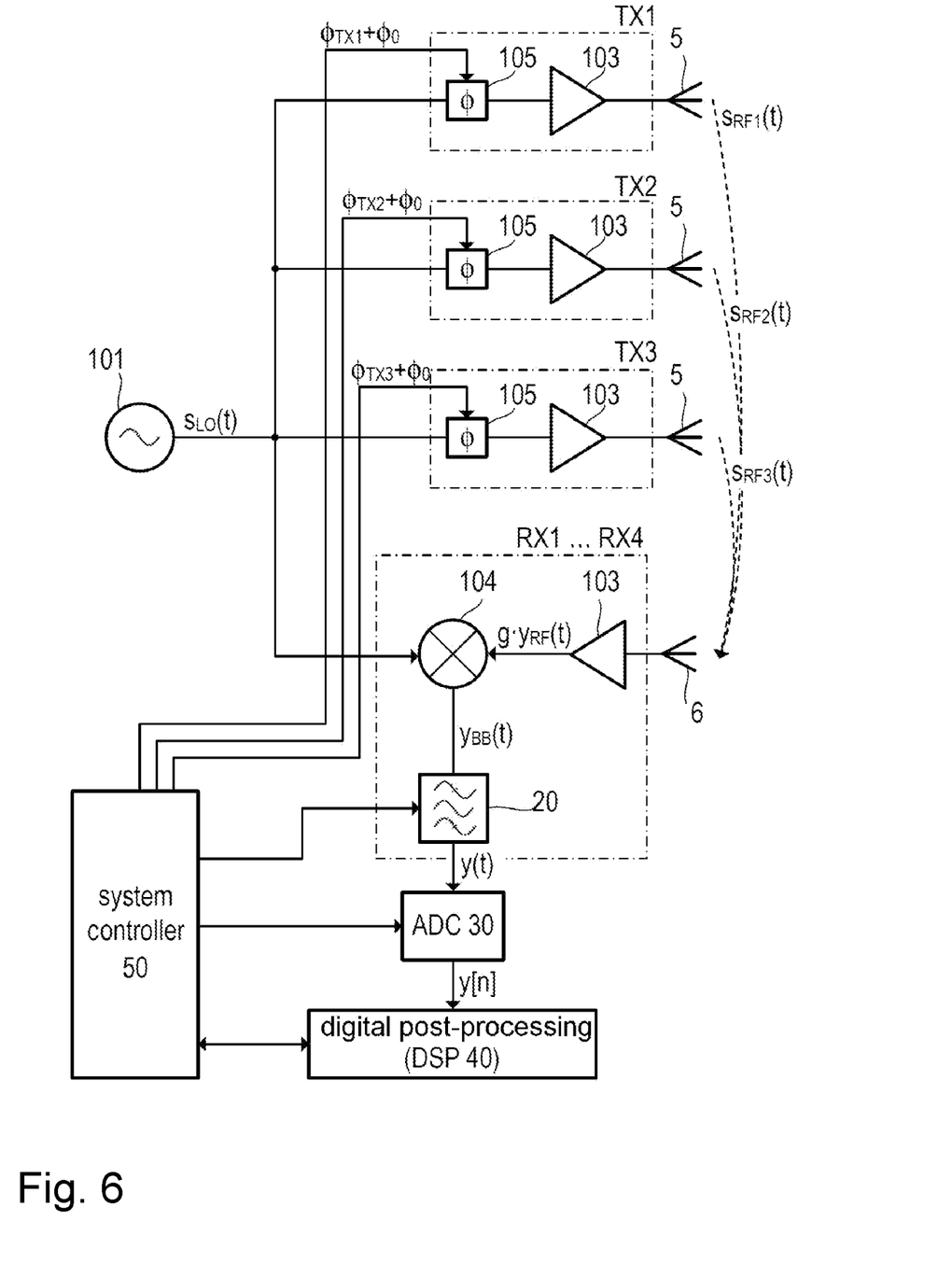
FIG. 6 illustrates a radar transceiver as an alternative to FIG. 5 by way of example.

FIG. 6 illustrates a further example, which is an alternative to the example from FIG. 5. The example from FIG. 6 is substantially identical to the example from FIG. 5, the only difference being that the phase shifter 106 can be omitted (or is set to a constant phase shift of e.g.) 0° and instead the phases $\phi_{TX1}$, $\phi_{TX2}$ and $\phi_{TX3}$ of the phase shifters 105 in the transmission channels TX1, TX2 and TX3 are modified by a phase offset $\phi_0$. A phase shift in the LO signal $s_{LO}(t)$ by the phase offset $\phi_{LO}$ by the phase shifter 106 is equivalent, with regard to the resultant baseband signal, to a phase shift in the RF radar signals $s_{RF1}(t)$, $s_{RF2}(t)$ and $s_{RF3}(t)$ of the TX channels TX1, TX2 and TX3 by a phase offset $\phi_0$ (by the phase shifters 105), if $\phi_0$ is equal to $\pm\phi_{LO}$. The purpose of the phase offset $\phi_{LO}$ or $\phi_0$ will be described in detail later on. The examples from FIGS. 5 and 6 are not mutually exclusive and are also combinable.

The aforementioned crosstalk is also outlined in FIG. 5 and FIG. 6. The leakage signal $y_{RF,L}(t)$ received in the reception channel RX1 is a superimposition of the time-delayed and attenuated transmission signals $s_{RF1}(t)$, $s_{RF2}(t)$ and $s_{RF3}(t)$ radiated by the transmission channels TX1, TX2 and TX3. That is to say $$y_{RF,L}(t)=a_1 s_{RF1}(t+-\tau_1)+a_2 s_{RF2}(t-\tau_2)+a_3 s_{RF3}(t-\tau_3),$$

where $a_1$, $a_2$ and $a_3$ denote the attenuation associated with the signals $s_{RF1}(t)$, $s_{RF2}(t)$ and $s_{RF3}(t)$ and $\tau_1$, $\tau_2$ and $\tau_3$ denote the associated delay times. The delay times $\tau_1$, $\tau_2$ and $\tau_3$ are significantly shorter than the round-trip delay times (RTDT) which are based on real radar targets. The leakage signal $y_{RF,L}(t)$ received in the reception channel RX1 is converted to baseband together with radar echoes from real radar targets in the reception channel (see FIG. 5, mixer 104) and increases the background noise, which can adversely affect the quality of the detection of radar targets.

Figure 7:
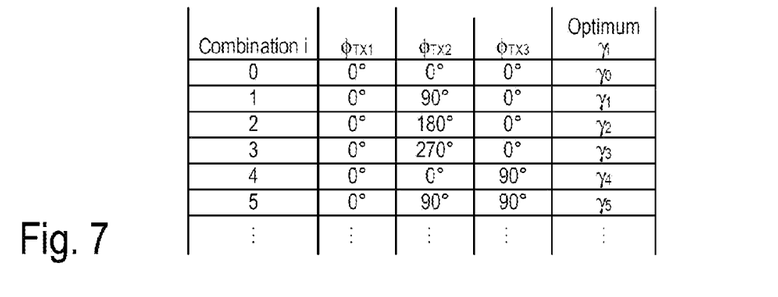
FIG. 7 uses a table to illustrate an example of various combinations of phase settings of the transmission channels that are sequentially set for the Doppler Division Multiplexing (DDM).

Radar systems having multiple TX channels can be operated in different ways. One known mode of operation is known as "time division multiplexing" (TDM). In this mode of operation, the TX channels are activated sequentially and only one TX channel is ever active, i.e. two TX channels never radiate a radar signal at the same time. Another mode of operation known per se is referred to as "Doppler division multiplexing" (DDM), where multiple or all TX channels are active and radiate radar signals at the same time, the phase settings of the phase shifters 105 of the transmission channels being able to be altered for each chirp in a chirp sequence. In this way, the phase of the transmitted chirps in a chirp sequence can be modulated, with for example binary phase shift keying (BPSK) or quaternary phase shift keying (QPSK) being able to be implemented. Before the start of each chirp in a chirp sequence, a prescribed scheme is used to adapt the phase settings $\phi_{TX1}$, $\phi_{TX2}$ and $\phi_{TX3}$ of the phase shifters 105. FIG. 7 illustrates a simple example of such a scheme.

FIG. 7 contains a table with different phase configurations of the transmission channels, i.e. combinations of the phase shifts $\phi_{TX1}$, $\phi_{TX2}$ and $\phi_{TX3}$ of the phase shifters 105 of the transmission channels TX1, TX2 and TX3. The individual configurations/combinations are consecutively numbered, the index i denoting a specific combination of phase shifts (i=0, 1, 2, 3, 4, ...). According to the example from FIG. 7, the phase shift $\phi_{TX1}$ of the transmission channel TX1 is always 0°, whereas the phase shift $\phi_{TX2}$ of the transmission channel TX1 is modulated. In the present example, it holds that $\phi_{TX2}=(90°\cdot i)$ mod 360, and $\phi_{TX3}=(90°\cdot(i \bmod 4))$ mod 360. The operator "mod" returns the remainder from the integer division by 360. The optimum phase offsets $\gamma_i$ contained in the table in FIG. 7 (right-hand column) will be discussed in more detail later on.

Figure 8:
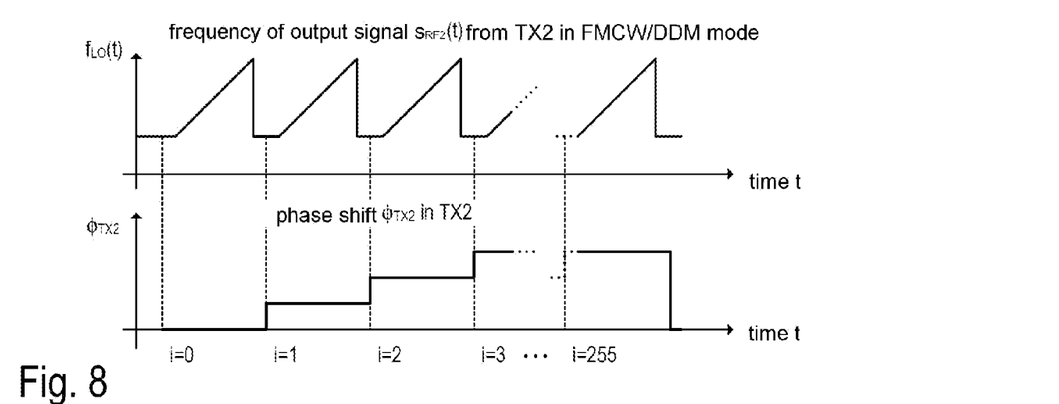
FIG. 8 illustrates the modulation of the phase for a chirp sequence.

FIG. 8 illustrates the phase modulation of the output signal $s_{RF2}(t)$ of the transmission channel TX2 (cf. FIG. 5) by way of example, for example in the DDM mode of the radar system. The upper timing diagram in FIG. 8 shows the characteristic of the frequency $f_{LO}$ of the output signal $s_{RF2}(t)$ during the radiation of a chirp sequence, which can comprise for example 256 chirps (frequency ramps). According to the table from FIG. 7, the phase shift $P_{TX2}$ caused by the phase shifter 105 of the transmission channel TX2 is changed over before the start of each chirp. As mentioned, Doppler division multiplexing (DDM) is known per se for radar sensors and is therefore not explained further here. The exemplary embodiments described here are also not restricted to radar systems in the DDM mode.

The aforementioned leakage signal $y_{RF,L}(t)$ (crosstalk) can, as mentioned, increase the background noise in the reception channels and can therefore adversely affect the quality of the detection of radar targets. It has been found that the increase in the background noise in baseband of an RX channel in the presence of a leakage signal is dependent on the phase of the leakage signal. An approach is described hereinbelow that can be used to achieve a reduction (theoretically a minimization) of the background noise by manipulating the phase difference $\Delta\phi$ of the RF input signals of the mixer 104 in an RX channel (e.g. RX1).

As can be seen in FIGS. 5 and 6, the phase difference $\Delta\phi$ in the RF input signals of the mixer 104 can be altered by virtue of either the phase of the LO signal $s_{LO}(t)$ or the phases of the transmission signals $s_{RF1}(t)$, $s_{RF2}(t)$ and $s_{RF3}(t)$ of all active transmission channels being altered. The phase of the LO signal $s_{LO}(t)$ can be altered by means of the phase shifter 106 (phase shift $\phi_{LO}$) and the phases of the transmission signals $s_{RF1}(t)$, $s_{RF2}(t)$ and $s_{RF3}(t)$ can be altered by means of the phase shifters 105 (phase shifts $\phi_{TX1}$, $\phi_{TX2}$ and $\phi_{TX3}$). An alteration of the phase shift $\phi_{LO}$ caused by the phase shifter 106 by a phase offset $\gamma_i$ has (theoretically) the same effect at the baseband output of the mixer 104 as an alteration of the phase shifts $\phi_{TX1}$, $\phi_{TX2}$ and $\phi_{TX3}$ caused by phase shifters 105 by the same offset $\gamma_i$. As already mentioned above, $\phi_{LO}=\gamma_i$ has the same effect as $\phi_0=\gamma_i$. In practice, however, it can be simpler to adapt the phase shift $\phi_{LO}$. The aim of the example described below is to ascertain an optimum phase offset $\gamma_i$ for the phase shift $\phi_{LO}$, a separate phase offset being ascertained for each possible combination of phase settings in the transmission channels (cf. table in FIG. 7). The LO signal $s_{LO}(t)$ is not frequency modulated to ascertain the optimum phase offsets $\gamma_i$, i.e. all RF signals are continuous wave signals, CW signals, when the optimum phase offsets $\gamma_i$ are determined as described below.

In the case of CW signals, the baseband signal $y_{BB}(t)$ generated by the mixer 104 is substantially a DC signal (without an AC signal component) plus noise, since the instantaneous frequency is the same for all RF signals (namely $f_{LO}$). The level $y_{DC}$ of the DC signal is proportional to the cosine of the phase difference $\Delta\phi$ of the RF input signals of the mixer 104, and investigations have shown that the background noise in baseband is at a minimum when the phase difference $\Delta\phi$ is approximately zero. In this case, the cosine of the phase difference $\Delta\phi$ is approximately one ($\cos(\Delta\phi)\approx 1$) and the level $y_{DC}$ of the DC signal is at a maximum.

In order to ascertain an optimum phase offset $\gamma_i$ for a specific combination (defined by the index i) of phase settings (phase shifts $\phi_{TX1}$, $\phi_{TX2}$ and $\phi_{TX3}$), all TX channels TX1, TX2, TX3 are activated with the respective phase settings of the phase shifters 105 as in the normal FMCW mode, but without frequency modulation of the LO signal. The radiated radar signals $s_{RF1}(t)$, $s_{RF2}(t)$ and $s_{RF3}(t)$ lead to a leakage signal $y_{RF,L}(t)$ that is received by the reception channel RX1 and, at the baseband output of the mixer 104, leads to a DC signal $y_{BB}(t)$ whose level $y_{DC}$ is dependent on the phase shift $\phi_{LO}$ of the phase shifter 106. Accordingly, it holds that $y_{BB}(t)=y_{DC}[\phi_{LO}]$, where $y_{DC}[\phi_{LO}]$ is not time-dependent, but rather is dependent only on the phase shift $\phi_{LO}$. The phase shift $\phi_{LO}$ is rotated in steps through 360° (i.e. one full phase rotation) or a multiple thereof, the level (the amplitude) of the baseband signal (DC signal) $y_{DC}[\phi_{LO}]$ changing based on the phase shift $\phi_{LO}$ and having a sinusoidal waveform. The sought optimum phase offset $\gamma_i$ corresponds to that phase shift $y_{DC}[\phi_{LO}]$ for which the level of the baseband signal $y_{DC}[\phi_{LO}]$ assumes a maximum. That is to say $$y_{DC}[\gamma_i] = \max\{y_{DC}[\phi_{LO}]\}, \text{ for } \phi_{LO} \in [0°, 360°].$$

As mentioned, for a phase shift $\phi_{LO}=\gamma_i$, the phase difference $\Delta\phi$ of the RF input signals of the mixer 104 is (theoretically) equal to 0 and the background noise caused by the leakage signal in baseband reaches a minimum.

Figure 9:
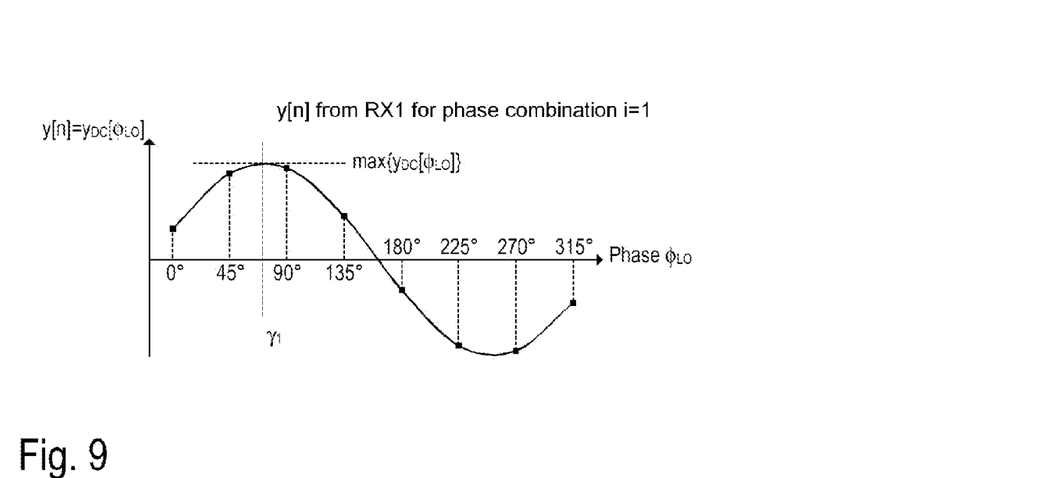
FIG. 9 uses a phase diagram to illustrate the ascertainment of the "optimum" phase offset for low noise.

Further illustration of the approach described above is provided by the graph in FIG. 9. FIG. 9 uses an example to illustrate how the DC signal $y_{DC}[\phi_{LO}]$ changes as the phase shift $\phi_{LO}$ varies. In the event of a phase shift of $\phi_{LO}=\gamma_i$ of approximately 70°, the DC signal $y_{DC}[\phi_{LO}]$ at the output of the mixer 104 is at a maximum. Various methods for calculating the angle position of the maximum are known and are therefore not discussed further here. For example, the sought phase offset $\gamma_i$ can be efficiently calculated by means of the Fast Fourier Transform (FFT) algorithm. The use of an FFT algorithm presupposes that the phase $\phi_{LO}$ is varied in equidistant steps over one full phase revolution (e.g. 0°, 45°, 90°, 135°, etc.).

The method described above can be repeated for each RX channel, so that an optimum phase offset $\gamma_i$ is ascertained for each RX channel and for any combination for phase settings of the phase shifters 105 in the TX channels. The method described is explained further on the basis of the flowchart in FIG. 10. However, even in the case of MIMO systems it can also be useful (and e.g. help to improve the signal-to-noise ratio in baseband) if the method described above is performed only for one RX channel (e.g. RX1).

Figure 10:
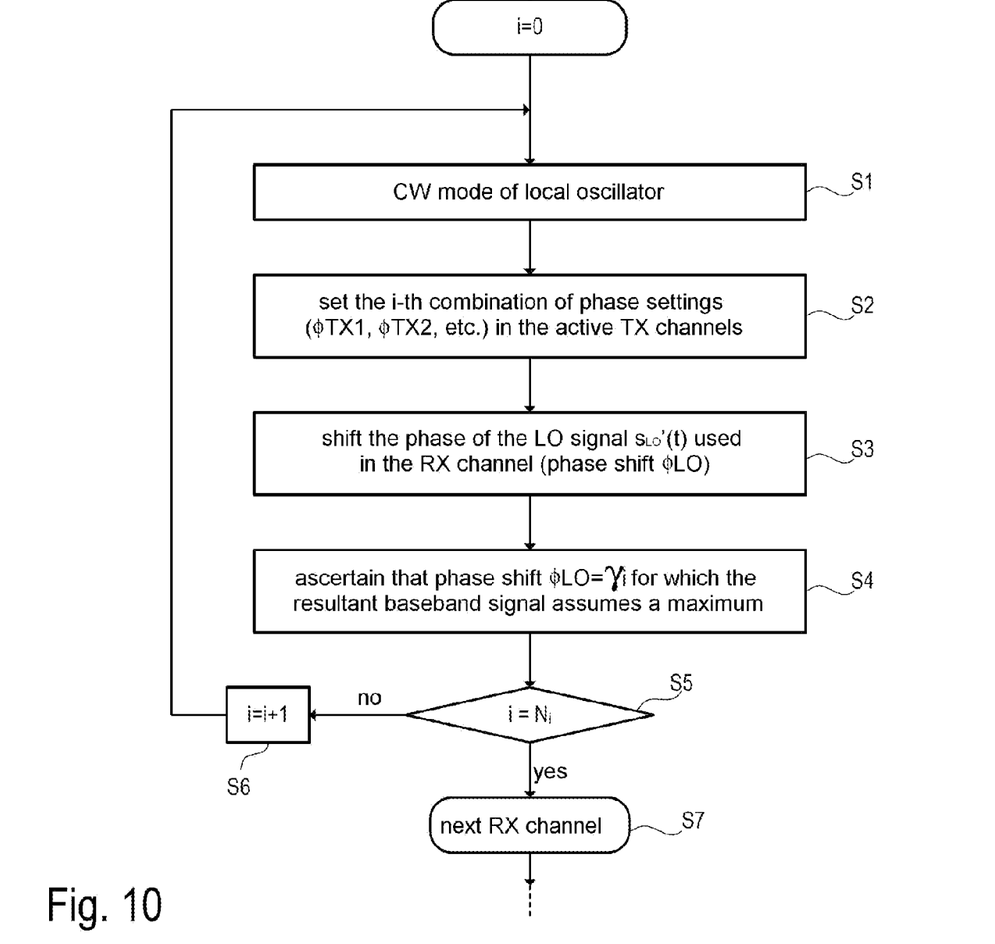
FIG. 10 is a flowchart to illustrate an example of the approach described here for ascertaining optimum phase offsets to reduce the background noise in baseband.

The method depicted in FIG. 10 can be used in a radar system in which a local oscillator signal $s_{LO}(t)$ (see e.g. FIG. 5, LO 101) is generated (FIG. 9, step S1) that is distributed to multiple transmission channels (see e.g. FIG. 5, TX1, TX2, TX3) and one or more reception channels (see e.g. FIG. 5, RX1) of a radar system. RF radar signals $s_{RF1}(t)$, $s_{RF2}(t)$, and $s_{RF3}(t)$ are generated in the respective transmission channels, which signals are then radiated. Each of the transmission channels contains a phase shifter (see e.g. FIG. 5, phase shifter 105) that is designed to alter the phase of the respective RF radar signal ($s_{RF1}(t)$, $s_{RF2}(t)$, and $s_{RF3}(t)$) by an adjustable phase shift $\phi_{TX1}$, $\phi_{TX2}$, and $\phi_{TX3}$. A first reception channel (see e.g. FIG. 5, RX1) receives an RF signal, and this is converted into a baseband signal $y_{BB}(t)=y_{DC}$ by using the local oscillator signal $s_{LO}'(t)$ supplied to the first reception channel.

FIG. 10 shows that the method comprises setting a specific combination of phase shifts $\phi_{TX1}$, $\phi_{TX2}$, and $\phi_{TX3}$ for the phase shifters 105 of the transmission channels (FIG. 10, step S2). An example of possible combinations of phase shifts is depicted in the table in FIG. 7, each combination being identified by an index i. The method also comprises altering (e.g. in steps) the phase of the local oscillator signal $s_{LO}'(t)$ supplied to the first reception channel or the previously set phase shifts $\phi_{TX1}$, $\phi_{TX2}$, $\phi_{TX3}$ of the phase shifters 105 by a phase offset (FIG. 10, step S3). In the example from FIG. 5, the phase shifter 106 is used to alter the phase of the local oscillator signal $s_{LO}'(t)$ supplied to the first reception channel RX1 by the phase offset $\phi_{LO}$. Alternatively, the phase shifts $\phi_{TX1}$, $\phi_{TX2}$, and $\phi_{TX3}$ previously set for the phase shifters 105 in step S2 can be altered by a phase offset $\phi_0$. This phase offset $\phi_0$ is identical for all TX channels, which is why the phases of the output signals $s_{RF1}(t)$, $s_{RF2}(t)$, and $s_{RF3}(t)$ of the TX channels TX1, TX2, TX3 relative to one another (i.e. the phase differences) do not change as a result of the phase offset $\phi_0$. The phase offset $\phi_0$ for the phase shifts $\phi_{TX1}+\phi_0$, $\phi_{TX2}+\phi_0$, and $\phi_{TX3}+\phi_0$ of the phase shifters 105 has the same effect as the phase shift $\phi_{LO}$ of the phase shifter 106 when $\phi_0=\pm\phi_{LO}$.

The phase can be altered (FIG. 10, step S3) e.g. in equidistant steps. This situation is depicted by way of example in FIG. 9. The level of the mixer output signal $y_{BB}(t)$ is dependent on the selected phase offset $\phi_{LO}$ or $\phi_0$. To find the "optimum" phase offset, the method also comprises ascertaining that phase offset $\gamma_i$ for which the mixer output signal $y_{BB}(t)$ (represented by the digitized signal y[n]) assumes a maximum (FIG. 10, step S4).

The method described above is repeated for every possible combination i of phase settings of the phase shifters 105 (cf. table in FIG. 7). FIG. 10 shows that a check is performed (step S5) to determine whether an optimum phase offset $\gamma_i$ has already been ascertained for all $N_i$ combinations (i=0, ... $N_i$−1). While this is not the case, the index i is incremented (FIG. 10, step S6). The procedure can then be repeated for the next RX channel. Ultimately, a table similar to that from FIG. 7 is obtained for every RX channel. In other words, the phase offsets $\gamma_i$ (i=0, ... $N_i$−1) ascertained for the different RX channels are e.g. stored in a lookup table (e.g. in the system controller 50).

It is to be noted that the method described here requires a high-pass filter or bandpass filter that is present in the analog baseband signal processing chain 20 to be deactivated so that the DC component of the mixer output signal $y_{BB}(t)$ also arrives at the analog-to-digital converter 30 (cf. FIG. 5). The high-pass filter or bandpass filter is required in the normal FMCW mode, however. The system controller 50 may therefore be designed to alter the transfer characteristic of the analog baseband signal processing chain 20 (temporarily for the method described here) such that the DC component of the mixer output signal $y_{BB}(t)$ is forwarded to the ADC 30. Accordingly, it holds that $y_{BB}(t) \approx y(t) \approx y[n] \approx y_{DC}$.

Figure 11:
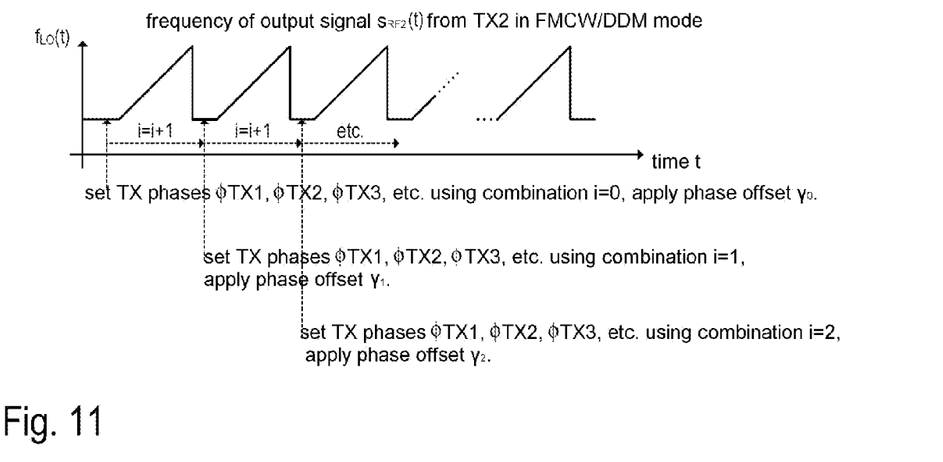
FIG. 11 shows a timing diagram that illustrates an FMCW mode of a radar transceiver with previously ascertained optimized phase offsets.

FIG. 11 shows a timing diagram that illustrates an FMCW mode (in the DDM mode of operation) of a radar transceiver with previously ascertained optimized phase offsets $\gamma_i$. The timing diagram from FIG. 11 illustrates the chirp sequence radiated by the transmission channel TX2 by way of example. Before the beginning of each individual chirp, the prescribed modulation scheme (cf. table in FIG. 7) is used to set the phase shifts $\phi_{TX1}$, $\phi_{TX2}$, $\phi_{TX3}$ of the phase shifters 105 and also to set the optimum phase offset $\phi_{LO}=\gamma_i$ for the phase shifter 106 (i=0, ... $N_i$−1). Alternatively, the prescribed modulation scheme (cf. table in FIG. 7) is used to alter the phase shifts $\phi_{TX1}$, $\phi_{TX2}$, $\phi_{TX3}$ by the optimum phase offset $\phi_0=\gamma_i$. In this case, the phase shifters 105 in the TX channels TX1, TX2 and TX3 are programmed with the phase shifts $\phi_{TX1}+\gamma_i$, $\phi_{TX2}+\gamma_i$, and $\phi_{TX3}+\gamma_i$ and the phase shifter 106 is not needed or is operated with its standard settings.

Figure 12:
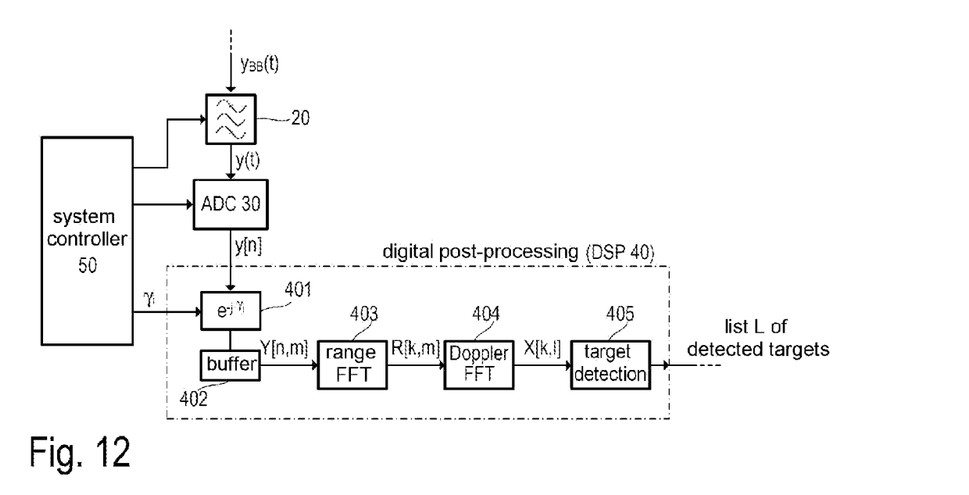
FIG. 12 is a block diagram to illustrate an example of the digital post-processing of the digitized baseband signal of the radar transceiver from FIG. 5 in the FMCW mode.

In the FMCW radar mode for detecting real radar targets, the phase offset $\gamma_i$ (which can be different for each chirp of a chirp sequence) needs to be compensated for again in the received baseband signal. FIG. 12 uses a block diagram to illustrate an example of the digital post-processing of the digitized baseband signal of the radar transceiver from FIG. 5 in the FMCW mode. In this case, the generation of the RF radar signals takes into consideration the phase offsets $\gamma_i$ discussed above, which reduces the noise in baseband and improves the signal-to-noise ratio. As already explained in detail above, the mixer output signal $y_{BB}(t)$ of the mixer 104 of an RX channel is supplied to the analog baseband signal processing chain 20, which essentially achieves bandpass filtering and optionally signal amplification. The filtered baseband signal y(t) is digitized (ADC 30) and digitally processed further as depicted in FIG. 12, for example.

FIG. 12 shows that the baseband signal is multiplied by the factor $\exp(-j\cdot\gamma_i)$ (see FIG. 1, function block 401), where j is the imaginary unit and exp(•) denotes the exponential function. It goes without saying that multiplication by $\exp(-j\cdot\gamma_i)$ corresponds to a phase shift by the phase offset $-\gamma_i$ (i.e. to a delay). The value of $\gamma_i$ is regularly adapted in accordance with the settings of the phase shifters 105 and 106. In this way, the effect of the varying phase offset can be compensated for. The subsequent signal processing is known per se by the name range Doppler analysis and is summarized only briefly hereinbelow.

The buffer 402 is used for buffering the samples of the digital baseband signal y[n] (compensated for by the phase offsets $\gamma_i$), wherein in each case M signal segments having N samples are processed further in blocks. M corresponds to the number of chirps in a transmitted chip sequence and N to the number of samples in the received signal segments, which can each be associated with a chirp of the chip sequence. A sequence having M signal segments can be regarded as an N×M matrix Y[n, m], wherein the aforementioned signal segments having N samples each are arranged in the M columns of the matrix (the matrix thus has N rows). This matrix is then subjected to a Fourier transformation, frequently referred to as "range FFT" (FFT stands for Fast Fourier Transform, function block 403), on a column by column basis. The resultant range matrix R[k, m] is likewise an N×M, where the Fourier transforms of the individual signal segments are arranged in the M columns of the range matrix R[k, m]. In a second stage, referred to as "Doppler FFT", a row-by-row Fourier transformation takes place (function block 404). The result obtained is what is known as the range Doppler matrix X[k, l], which is also referred to as a range Doppler map or range Doppler image. This range Doppler map can be taken as a basis for performing the target detection by means of methods known per se.

Figure 13:
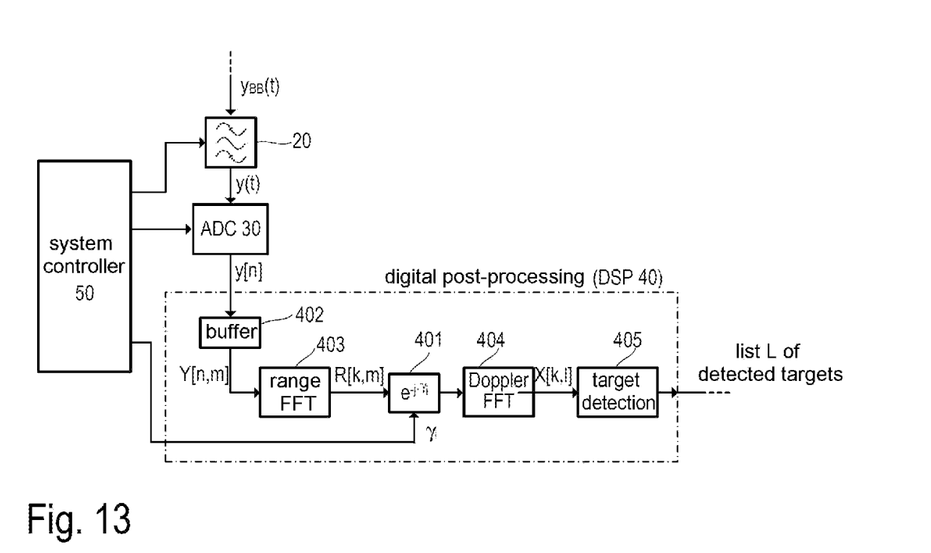
FIG. 13 illustrates an alternative to FIG. 12.

In the example from FIG. 12, the phase offset $\gamma_i$ is compensated for in the time domain by multiplication by the factor $\exp(-j\cdot\gamma_i)$. Alternatively, the compensation can also be effected in the frequency domain on the basis of the range FFT. This alternative is depicted in FIG. 13. Before the range FFT is performed, the signal segment to be transformed (a column of the matrix Y[n,m]) is normally multiplied by a window function. Compensation for the phase offset $\gamma_i$ can as another alternative also be achieved by virtue of the phase offsets $\gamma_i$ (i.e. the factor $\exp(-j\cdot\gamma_i)$) being taken into consideration in the window function.

Figure 14:
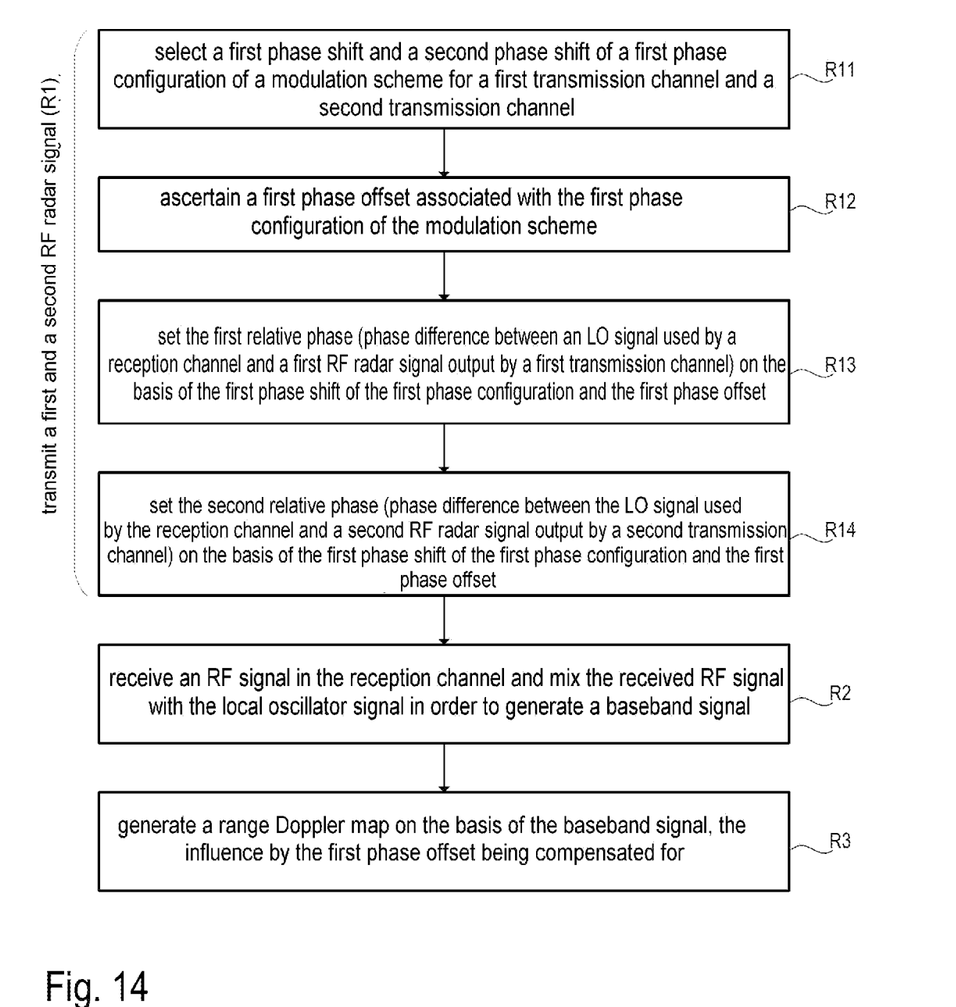
FIG. 14 is a flowchart to illustrate an example of a radar method that takes into consideration previously ascertained phase offsets.

Once the optimum phase offsets $\gamma_i$ for a specific modulation scheme (see table in FIG. 7) have been ascertained, these can be stored (e.g. in the system controller 50) and used in the radar mode. The flowchart from FIG. 14 summarizes an example of a radar method in which previously ascertained and stored phase offsets $\gamma_i$ are used. Steps R11, R12, R13 and R14 depicted in FIG. 14 relate to the generation and transmission of a first and a second RF radar signal $s_{RF1}(t)$ and $s_{RF2}(t)$ (superordinate step R1) via a first transmission channel TX1 and a second transmission channel TX2, respectively.

FIG. 14 shows that the method comprises selecting a first phase shift $\phi_{TX1}$ and a second phase shift $\phi_{TX2}$ of a first phase configuration of a modulation scheme for the first transmission channel TX1 and the second transmission channel TX2, respectively (see FIG. 14, step R11). A specific phase configuration (e.g. i=0) of a modulation scheme would be a row of the table in the example from FIG. 7, where the index i denotes the phase configuration. The method also comprises ascertaining a first phase offset $\gamma_0$ (see FIG. 14, step R12), which is associated with the first phase configuration of the modulation scheme. Subsequently, a first and a second relative phase are set (see FIG. 14, steps R13 and R14), wherein the first relative phase determines a first phase difference between an LO signal $s_{LO}'(t)$ used by a reception channel RX1 of the radar system (see e.g. FIG. 5) and the first RF radar signal $s_{RF1}(t)$ and wherein the second relative phase determines a second phase difference between the local oscillator signal $s_{LO}'(t)$ used by the reception channel RX1 and the second RF radar signal $s_{RF2}(t)$.

The first relative phase is set based on the first phase shift $\phi_{TX1}$ of the first phase configuration (index i=0) and the associated first phase offset $\gamma_0$ (FIG. 14, step R13), and the second relative phase is set based on the second phase shift $\phi_{TX2}$ of the first phase configuration and the first phase offset $\gamma_0$ (FIG. 14, step R14).

In the reception channel RX1, an RF signal $y_{RF}(t)$ is received and mixed to baseband using the LO signal $s_{LO}'(t)$ (see FIG. 14, step R2, cf. FIG. 5, baseband signal y(t)). The method also comprises, as shown in FIG. 14, the generation of a range Doppler map based on the baseband signal y(t), wherein the generation of the range Doppler map comprises an operation to compensate for an influence of the first phase offset $\gamma_0$ (see FIG. 14, step R3).

Performance of a radar measurement involves a sequence with a multiplicity of chirps being transmitted, as e.g. depicted in FIG. 2, wherein a different radar configuration can be chosen for each chirp. That is to say that, for the example from FIG. 7, the table is "processed" for all configurations i=0, . . . , N–1 of a modulation scheme.

What is claimed is:

1. A method for a radar system comprising a local oscillator (LO) for generating a local oscillator signal; an LO phase shifter configured to receive the LO signal and apply a phase shift to the LO signal according to a phase setting to generate a phase-shifted LO signal; a plurality of transmission channels that are each supplied with the LO signal; a reception channel that is supplied with the phase-shifted LO signal wherein each of the plurality of transmission channels is configured generate and output a respective RF radar signal based on the LO signal; a plurality of phase shifters, each transmission channel including a different one of the plurality of phase shifters and each phase shifter being configured to alter a phase of a respective RF radar signal of its transmission channel, and wherein the reception channel is configured to receive an RF signal and to convert it into a baseband signal by using the phase-shifted local oscillator signal supplied to the reception channel, wherein the method comprises:

operating the local oscillator in a continuous wave (CW) mode;

setting a specific combination of phase shifts for the plurality of phase shifters of the plurality of transmission channels;

while the specific combination of phase shifts remains fixed, altering the phase setting of the LO phase shifter to generate the phase-shifted LO signal having a plurality of LO phase shifts;

measuring a signal amplitude of the DC signal component of the baseband signal for each of the plurality of LO phase shifts; and determining for which LO phase shift out of the plurality of LO phase shifts the signal amplitude of the DC signal component assumes a maximum value.

2. The method as claimed in claim 1, wherein determining for which LO phase shift out of the plurality of LO phase shifts the signal amplitude of the DC signal component assumes a maximum value is performed for a plurality of specific combinations of phase shifts of the plurality of phase shifters of the plurality of transmission channels.

3. The method as claimed in claim 2, further comprising:

storing the phase setting for determined LO phase shift for each of the plurality of specific combinations of phase shifts.

4. The method as claimed in claim 3, further comprising:

operating the local oscillator in a frequency-modulated continuous-wave (FMCW) mode;

modulating the phase of the output RF radar signals, wherein a prescribable modulation scheme is used to set different specific combinations of phase shifts for the plurality of phase shifters of the plurality of transmission channels sequentially, and wherein the previously ascertained and stored phase offset setting is also used for each specific combination of phase shifts that is set.

5. The method as claimed in claim 1, further comprising:

applying the phase setting corresponding to the determined LO phase shift to the LO phase shifter for the specific combination of phase shifts to compensate for a phase offset in the baseband signal.

6. The method as claimed in claim 1, wherein the received RF signal comprises a signal component that is caused by crosstalk by the RF radar signals.

7. The method as claimed in claim 1, wherein the altering of the LO phase shifts of the LO phase shifter does not alter the phase differences between the RF radar signals.

8. A radar system, comprising:

a local oscillator (LO) for generating an LO signal;

an LO phase shifter configured to receive the LO signal and apply a phase shift to the LO signal according to a phase setting to generate a phase-shifted LO signal;

a plurality of transmission channels that are each supplied with the LO signal;

a reception channel that is supplied with the phase-shifted LO signal, wherein each of the plurality of transmission channels is configured generate and output a respective RF radar signal based on the LO signal, and wherein the reception channel is configured to receive an RF signal and to convert it into a baseband signal by using the phase-shifted LO signal supplied to the reception channel;

a plurality of phase shifters, each transmission channel including a different one of the plurality of phase shifters and each phase shifter being configured to alter a phase of a respective RF radar signal of its transmission channel; and a controller that is configured to:
configure the local oscillator for a continuous wave (CW) mode;
set a specific combination of phase shifts for the plurality of phase shifters of the plurality of transmission channels;
while the specific combination of phase shifts remains fixed, alter the phase setting of the LO phase shifter to generate the phase-shifted LO signal having a plurality of LO phase shifts; and at least one processor configured to measure a signal amplitude of the DC signal component of the baseband signal for each of the plurality of LO phase shifts and determine for which LO phase shift out of the plurality of LO phase shifts the signal amplitude of the DC signal component assumes a maximum value.

9. The radar system as claimed in claim 8, wherein the system controller is further configured to ascertain the LO phase shift for which the signal amplitude of the DC signal component of the baseband signal assumes a maximum value, and to store the ascertained LO phase shift, for each of a plurality of specific combinations of phase shifts of the plurality of phase shifters.

10. The radar system as claimed in claim 8, wherein the controller is configured to select the phase setting corresponding to the LO phase shift that causes the signal amplitude of the DC signal component of the baseband signal to assume a maximum value as an optimum phase setting for the specific combination of phase shifts.

11. The radar system as claimed in claim 8, wherein:

the controller is configured to rotate the LO phase shift of the phase-shifted local oscillator signal in steps through a 360° phase rotation, and the at least one processor configured determine for which LO phase shift through the 360° phase rotation causes the signal amplitude of the DC signal component of the baseband signal to assume a maximum value.

12. The radar system as claimed in claim 8, wherein the RF signal comprises a leakage signal or a crosstalk signal that is a superimposition of each of the RF radar signals transmitted by the plurality of transmission channels.

13. The radar system as claimed in claim 8, wherein the signal amplitude of the DC signal component of the baseband signal is a DC value.

14. A method, comprising:

setting a first relative phase and a second relative phase in a radar system, wherein the first relative phase determines a first phase difference between a local oscillator (LO) signal used by a reception channel of the radar system and a first RF radar signal output by a first transmission channel of the radar system and wherein the second relative phase determines a second phase difference between the LO signal used by the reception channel of the radar system and a second RF radar signal output by a second transmission channel of the radar system;

wherein the setting of the first relative phase and the second relative phase comprises:
selecting a first phase shift and a second phase shift of a first phase configuration of a modulation scheme for the first transmission channel and the second transmission channel, respectively;

ascertaining a first phase offset associated with the first phase configuration of the modulation scheme wherein ascertaining a first phase offset comprises:
  applying, by a LO phase shifter, a phase shift to the LO signal according to a phase setting to generate a phase-shifted LO signal used by the reception channel to generate a baseband signal;
  altering the phase setting of the LO phase shifter to generate the phase-shifted LO signal having a plurality of LO phase shifts;
  measuring a signal amplitude of the DC signal component of the baseband signal for each of the plurality of LO phase shifts; and
  determining for which LO phase shift out of the plurality of LO phase shifts the signal amplitude of the DC signal component assumes a maximum value, wherein the determined LO phase shift is the first phase offset;
setting the first relative phase based on the first phase shift of the first phase configuration and the first phase offset and setting the second relative phase based on the second phase shift of the first phase configuration and the first phase offset;
receiving an RF signal in the reception channel and mixing the received RF signal with the LO signal in order to generate a baseband signal; and
  generating a range Doppler map based on the baseband signal, wherein the generating of the range Doppler map comprises an operation to compensate for an influence of the first phase offset.

15. The method as claimed in claim 14,
wherein the setting of the first relative phase and the second relative phase comprises the following:
  selecting a first phase shift and a second phase shift of a second phase configuration of the modulation scheme for the first transmission channel and the second transmission channel, respectively;
  ascertaining a second phase offset associated with the second phase configuration of the modulation scheme;
  setting the first relative phase based on the first phase shift of the second phase configuration and the second phase offset and setting the second relative phase based on the second phase shift of the second phase configuration and the second phase offset; and
wherein the method further comprises:
generating a range Doppler map based on the baseband signal, wherein the generating of a range Doppler map comprises an operation to compensate for an influence by the second phase offset.

\* \* \* \* \*